(12) United States Patent
Chen et al.

(10) Patent No.: US 12,234,318 B2
(45) Date of Patent: Feb. 25, 2025

(54) THERMOSETTING EPOXY RESIN COMPOSITION AND PREPREG, LAMINATED BOARD AND PRINTED CIRCUIT BOARD USING THERMOSETTING EPOXY RESIN COMPOSITION

(71) Applicant: SHENGYI TECHNOLOGY CO., LTD., Guangdong (CN)

(72) Inventors: Yong Chen, Guangdong (CN); Yongjing Xu, Guangdong (CN); Guofang Tang, Guangdong (CN)

(73) Assignee: SHENGYI TECHNOLOGY CO., LTD. (CN)

( * ) Notice: Subject to any disclaimer, the term of this patent is extended or adjusted under 35 U.S.C. 154(b) by 387 days.

(21) Appl. No.: 17/787,424

(22) PCT Filed: Mar. 31, 2020

(86) PCT No.: PCT/CN2020/082466
§ 371 (c)(1),
(2) Date: Jun. 20, 2022

(87) PCT Pub. No.: WO2021/128630
PCT Pub. Date: Jul. 1, 2021

(65) Prior Publication Data
US 2023/0045615 A1 Feb. 9, 2023

(30) Foreign Application Priority Data

Dec. 26, 2019 (CN) .................. 201911369409.X

(51) Int. Cl.
| | | |
|---|---|---|
| B32B 15/092 | (2006.01) | |
| B32B 7/12 | (2006.01) | |
| B32B 15/14 | (2006.01) | |
| B32B 15/20 | (2006.01) | |
| B32B 27/38 | (2006.01) | |
| C08G 59/40 | (2006.01) | |
| C08G 59/42 | (2006.01) | |
| C08J 5/24 | (2006.01) | |
| C08K 3/22 | (2006.01) | |
| C08K 3/32 | (2006.01) | |
| C08K 3/36 | (2006.01) | |
| C08K 5/5313 | (2006.01) | |
| C08K 5/5377 | (2006.01) | |

(Continued)

(52) U.S. Cl.
CPC ............ *C08G 59/4238* (2013.01); *B32B 7/12* (2013.01); *B32B 15/14* (2013.01); *B32B 15/20* (2013.01); *C08G 59/4223* (2013.01); *C08G 59/4261* (2013.01); *C08J 5/244* (2021.05); *C08K 3/22* (2013.01); *C08K 3/32* (2013.01); *C08K 3/36* (2013.01); *C08K 5/5313* (2013.01); *C08K 5/5377* (2013.01); *C08K 5/5419* (2013.01); *B32B 5/022* (2013.01); *B32B 5/024* (2013.01); *B32B 5/26* (2013.01); *B32B 2250/40* (2013.01); *B32B 2255/06* (2013.01); *B32B 2255/26* (2013.01); *B32B 2260/023* (2013.01); *B32B 2260/046* (2013.01); *B32B 2262/101* (2013.01); *B32B 2457/08* (2013.01); *C08J 2363/00* (2013.01); *C08K 2003/2227* (2013.01); *C08K 2003/2241* (2013.01); *C08K 2003/327* (2013.01); *C08K 2201/003* (2013.01)

(58) Field of Classification Search
None
See application file for complete search history.

(56) References Cited

U.S. PATENT DOCUMENTS

| | | |
|---|---|---|
| 5,500,285 A | 3/1996 | Vittorio et al. |
| 2011/0172384 A1 | 7/2011 | Su et al. |

(Continued)

FOREIGN PATENT DOCUMENTS

| | | |
|---|---|---|
| CN | 1350030 | 5/2002 |
| CN | 102070770 | 5/2011 |

(Continued)

OTHER PUBLICATIONS

Patent Cooperation Treaty (PCT), International Search Report and Written Opinion for Application PCT/CN2020/082466 filed on Mar. 31, 2020, mailed Sep. 28, 2020 International Searching Authority, CN.

State Intellectual Property Office of People's Republic of China, Notification of First Search Report for Application No. 201911369409, China.

(Continued)

*Primary Examiner* — Michael J Feely
(74) *Attorney, Agent, or Firm* — McDonald Hopkins LLC

(57) ABSTRACT

Provided are a thermosetting epoxy resin composition and a prepreg, laminated board and printed circuit board using the thermosetting epoxy resin composition. The thermosetting epoxy resin composition comprises the following components in parts by weight: 2-10 parts of a phosphorus-containing anhydride, 5-40 parts of a phosphorus-free anhydride, 5-45 parts of an epoxy resin, 40-70 parts of a filler, and 0-15 parts of a phosphorus-containing flame retardant, with the total part by weight of all these components being 100 parts, wherein the phosphorus-containing anhydride has a structure as represented by formula I or II, and the epoxy resin is selected from one of or a combination of at least two of a bisphenol A epoxy resin, a bisphenol F epoxy resin and a biphenyl epoxy resin. The thermosetting epoxy resin composition also has good heat resistance, discoloration resistance and dimensional stability after curing while ensuring V-0 grade flame resistance, and can be used for the preparation of printed circuit board substrates in the field of LEDs.

16 Claims, No Drawings

(51) Int. Cl.
*C08K 5/5419* (2006.01)
*B32B 5/02* (2006.01)
*B32B 5/26* (2006.01)

(56) References Cited

U.S. PATENT DOCUMENTS

2020/0291172 A1\* 9/2020 Ye .................... C07F 9/657172
2022/0185945 A1\* 6/2022 Nii .......................... B32B 17/10

FOREIGN PATENT DOCUMENTS

| | | |
|---|---|---|
| CN | 106750183 | 5/2017 |
| CN | 107383340 | 11/2017 |
| CN | 108164684 | 6/2018 |
| CN | 110156959 | 8/2019 |
| KR | 20120026492 A | 3/2012 |
| WO | 2018103199 | 6/2018 |
| WO | 2019090563 | 5/2019 |

OTHER PUBLICATIONS

State Intellectual Property Office of People's Republic of China, Notification of First Office Action for Application No. 201911369409, China.

\* cited by examiner

THERMOSETTING EPOXY RESIN COMPOSITION AND PREPREG, LAMINATED BOARD AND PRINTED CIRCUIT BOARD USING THERMOSETTING EPOXY RESIN COMPOSITION

CROSS-REFERENCE TO RELATED APPLICATIONS

This application is a U.S. National Stage Application, filed under 35 U.S.C. 371 of International Patent Application No. PCT/CN2020/082466 filed on Mar. 31, 2020, which claims priority to Chinese Patent Application No. 201911369409.X filed with the China National Intellectual Property Administration (CNIPA) on Dec. 26, 2019, the disclosure of which are incorporated herein by reference in their entireties.

TECHNICAL FIELD

The present application belongs to the technical field of printed circuit boards, and particularly, relates to a thermosetting epoxy resin composition and a prepreg, a laminate and a printed circuit board using the same.

BACKGROUND

In recent years, optical semiconductors represented by LED have been used in display applications, mobile devices, backlight sources for mobile phone, sensors, automotive components, etc. With the improvement of LED power and brightness, laminates/metal foil-clad laminates used in printed circuit boards for LED installation are required to have excellent light resistance, and especially, have high whiteness after high temperature. Additionally, as people pay more and more attention to the environment and the lead-free reflow soldering process is gradually promoted, for the installation stability, the increasingly harsh requirements have been put on the flame retardant property and dimensional stability of laminates/metal foil-clad laminates.

CN 109181604A uses a bisphenol A/bisphenol F epoxy resin, methyltetrahydrophthalic anhydride or nadic anhydride, and catalyst to obtain a high transparent epoxy resin adhesive, but this combination has no flame retardancy and is not used for prepregs or laminates.

CN 108641650A discloses using a bisphenol F epoxy, carboxy-terminated butyl rubber, diaminodiphenyl sulfone, imidazole, surfactant, aluminium oxide, boron nitride, and ethylene glycol methyl ether to prepare a LED circuit epoxy resin adhesive, but this system does not have high whiteness, and has poor heat discoloration resistance after high temperature treatment.

CN 103459493A uses an epoxy resin with bisphenol A backbone, cycloaliphatic epoxy resin, acid anhydride of totally or partially hydrogenated compound of aromatic polycarboxylic acid, titanium dioxide and dispersant to prepare a resin composition, achieving high peel strength and high reflectivity after heat treatment, but this composition cannot achieve flame retardancy and has poor dimensional stability.

CN 107815280A uses a bisphenol A epoxy resin, dicyandiamide, magnesium hydroxide, silicon micropowder and the like to improve the insulativity of LED copper clad laminates, but this system does not have high whiteness and high heat discoloration resistance.

CN 106381111A uses a liquid bisphenol A resin, solid bisphenol A resin, phenolic resin, inorganic filler and whitener to facilitate to the copper clad laminate adhesive liquid achieving high whiteness, good adhesion and anti-ultraviolet function, but this system is extremely easily discolored after high temperature treatment.

Therefore, a laminate/metal foil-clad laminate with high whiteness, high heat discoloration resistance, high dimensional stability and high flame retardancy is expected in the art, because the laminate satisfies the performance requirements on base materials of the printed circuit board in LED and other fields.

SUMMARY

In view of the deficiencies in the prior art, an object of the present application is to provide a thermosetting epoxy resin composition and a prepreg, a laminate and a printed circuit board using the same. The thermosetting epoxy resin composition also has good heat discoloration resistance and dimensional stability while ensuring V0 grade flame retardancy, satisfying the performance requirements on laminates in the LED field, such as high whiteness, high heat-resistance whiteness and high dimensional stability.

To achieve this object, the present application uses the technical solutions described below.

In a first aspect, the present application provides a thermosetting epoxy resin composition, which includes the following components in part by weight:

Component A: 2-10 parts of a phosphorus-containing anhydride, Component B: 5-40 parts of a phosphorus-free anhydride, Component C: 5-45 parts of an epoxy resin, Component D: 40-70 parts of a filler, and Component E: 0-15 parts of a phosphorus-containing flame retardant;

the total part by weight of the Component A, Component B, Component C, Component D and Component E is 100 parts;

the phosphorus-containing anhydride has a structure represented by Formula I or Formula II as follows:

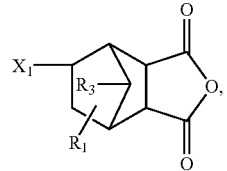

Formula I

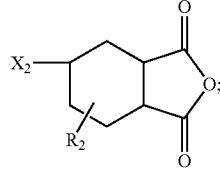

Formula II in which $R_1$ and $R_2$ are each independently selected from any one of hydrogen, C1-C5 (such as C1, C2, C3, C4, C5) alkyl, substituted or unsubstituted phenyl, substituted or unsubstituted naphthyl;

$R_3$ is selected from any one of hydrogen, C1-C5 (such as C1, C2, C3, C4, C5) alkyl, siloxy and siloxyalkyl;

$X_1$ and $X_2$ are each independently selected from any one of

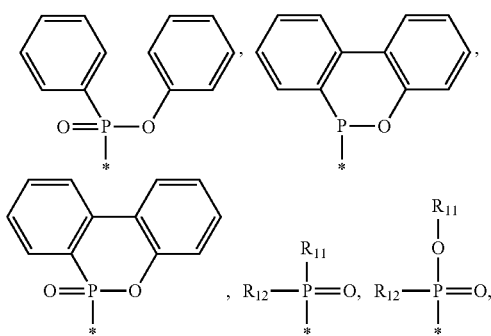

in which * represents a linkage site of the group;

$R_{11}$ and $R_{12}$ are each independently selected from any one of C1-C5 alkyl, benzoxazinyl, substituted or unsubstituted phenyl, substituted or unsubstituted naphthyl;

when the group contains a substituent, the substituent is a halogen atom or a C1-C5 (such as C1, C2, C3, C4, C5) linear or branched alkyl group; and the epoxy resin is selected from one or a combination of at least two of a bisphenol A epoxy resin, a bisphenol F epoxy resin and a biphenyl epoxy resin.

It should be noted that the epoxy resin in the present application does not include the epoxy resin with the other structure beyond the limited range described above. When the epoxy resins other than the bisphenol A epoxy resin, bisphenol F epoxy resin and biphenyl epoxy resin are used, the dimensional stability and heat discoloration resistance of the composition will be significantly reduced, which cannot satisfy the performance requirements on laminates in the LED field, including high dimensional stability and high heat-resistance whiteness.

Organic phosphorus-containing materials have good flame retardancy, but they are usually prone to yellowing at high temperatures. It is found by the inventor after studying that by using the phosphorus-containing anhydride of the Formula I or Formula II combined with the epoxy resin of the specific type (one or a combination of at least two of a bisphenol A epoxy resin, a bisphenol F epoxy resin and a biphenyl epoxy resin) under a prescribed proportion, the obtained thermosetting epoxy resin composition also has high heat discoloration resistance and dimensional stability while reaching V0 grade flame retardancy.

In the present application, the part by weight of the phosphorus-containing anhydride is 2-10 parts, such as 2 parts, 2.5 parts, 3 parts, 3.5 parts, 4 parts, 4.5 parts, 5 parts, 5.5 parts, 6 parts, 6.5 parts, 7 parts, 7.5 parts, 8 parts, 8.5 parts, 9 parts, 9.5 parts or 10 parts, etc.

In the present application, when Component A of phosphorus-containing anhydride has a too small usage amount, the obtained thermosetting epoxy resin composition will have poor flame retardancy, hardly satisfying the application requirements: when Component A of phosphorus-containing anhydride has a too large usage amount, the heat discoloration resistance, dimensional stability and moisture resistance of the thermosetting epoxy resin composition will all significantly decreased accordingly. In the present application, when the part by weight of the phosphorus-containing anhydride is 2-10 parts, the composition can be ensured to meet the V0 grade flame retardancy, and meanwhile, no deterioration effect will be brought to the thermosetting epoxy resin composition on whiteness, heat discoloration resistance or dimensional stability.

The part by weight of the phosphorus-free anhydride is 5-40 parts, such as 5 parts, 8 parts, 10 parts, 12 parts, 15 parts, 18 parts, 20 parts, 22 parts, 25 parts, 28 parts, 30 parts, 32 parts, 35 parts, 38 parts or 40 parts, etc.

When the phosphorus-free anhydride has a too small usage amount, the heat yellowing resistance of the obtained thermosetting epoxy resin composition will deteriorate: when the phosphorus-free anhydride has a too large usage amount, the peel strength of the obtained thermosetting epoxy resin composition will deteriorate.

The part by weight of the epoxy resin is 5-45 parts, such as 5 parts, 8 parts, 10 parts, 12 parts, 15 parts, 18 parts, 20 parts, 22 parts, 25 parts, 28 parts, 30 parts, 32 parts, 35 parts, 38 parts, 40 parts, 42 parts or 45 parts, etc.

There will appear a risk of poor dimensional stability when the epoxy resin is too much or too little.

The part by weight of the filler is 40-70 parts, such as 40 parts, 42 parts, 45 parts, 48 parts, 50 parts, 52 parts, 55 parts, 58 parts, 60 parts, 62 parts, 65 parts, 68 parts or 70 parts, etc.

The part by weight of the phosphorus-containing flame retardant is 0-15 parts, such as 0 part, 1 part, 2 parts, 3 parts, 4 parts, 5 parts, 6 parts, 7 parts, 8 parts, 9 parts, 10 parts, 11 parts, 12 parts, 13 parts, 14 parts or 15 parts, etc.

The phosphorus-containing flame retardant can be selectively added according to the flame retardant effect, but the usage amount of phosphorus-containing flame retardant cannot exceed 15 parts. When the phosphorus-containing flame retardant is excessive, it will be caused that the viscosity of the thermosetting epoxy resin composition is too large, easily leading to negative effects, such as the filler is hard to be dispersed, deterioration of peel strength, and pits appear when the reinforcing material is composited into the composition.

As a preferred technical solution of the present application, $R_3$ in Formula I is siloxy or siloxy alkyl.

Preferably, $R_3$ in Formula I is selected from any one of

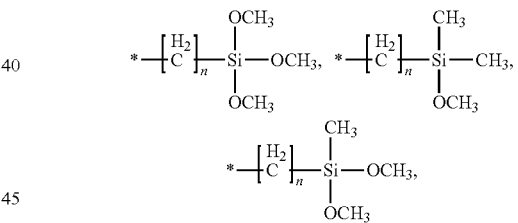

in which n is an integer of 1-3 (such as 1, 2 or 3), and * represents a linkage site of the group.

As a preferred technical solution of the present application, the phosphorus-free anhydride is selected from one or a combination of at least two of methyltetrahydrophthalic anhydride, methylnadic anhydride and styrene-maleic anhydride.

Preferably, the styrene-maleic anhydride has a structure represented by Formula III as follows:

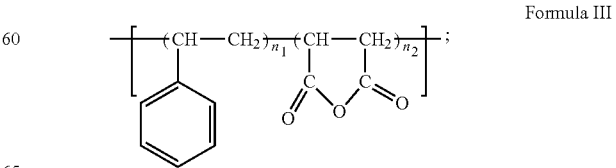

Formula III in which, $n_1:n_2=0.8-19:1$.

Preferably, a number average molecular mass of the styrene-maleic anhydride is 1000-50000, such as 1000, 1500, 2000, 2500, 3000, 3500, 4000, 4500, 5000, 6000, 7000, 8000, 9000, 10000, 15000, 20000, 25000, 30000, 35000, 40000, 45000 or 50000, etc; more preferably 1500-45000, and further preferably 2000-40000.

It should be noted that the number average molecular mass described in the present application is the number average molecular mass measured by gel permeation chromatography.

As a preferred technical solution of the present application, the filler is selected from one or a combination of at least two of titanium dioxide, boehmite and aluminum hydroxide. Among them, titanium dioxide, also known as titanium white powder, is a kind of white filler that facilitates to improving the whiteness of the thermosetting epoxy resin composition and the laminate using the same. Therefore, the filler is more preferably titanium dioxide.

Preferably, a median particle size of the filler is 0.1-10 μm; such as 0.1 μm, 0.5 μm, 1 μm, 2 μm, 3 μm, 4 μm, 5μ, 6 μm, 7 μm, 8μ, 9μ m or 10 μm, etc.

In the thermosetting epoxy resin composition in the present application, in addition to the above titanium dioxide, boehmite and aluminum hydroxide, other organic or inorganic fillers can also be added, such as silica, kaolin, talc, hydrotalcite, silicic acid calcium, beryllium oxide, boron nitride, glass powder, zinc borate, aluminum-nitrogen compound, silicon nitride, silicon carbide, magnesium oxide, zirconium oxide, mullite, potassium titanate, hollow glass beads, polytetrafluoroethylene powder, polystyrene powder and other powders, or potassium titanate, silicon carbide, silicon nitride or aluminum oxide single crystal fibers, or glass short fibers, etc. The addition amount is preferably 10-60% of the total weight of the thermosetting epoxy resin composition, more preferably 10-40%; if the amount exceeds 60%, the viscosity of the resin system will increase, and meanwhile, the laminate after the composition cured will cause difficulty in PCB processing.

As a preferred technical solution of the present application, the phosphorus-containing flame retardant is an aluminum phosphate salt and/or a high-melting-point phosphorus-containing flame retardant, and the high-melting-point phosphorus-containing flame retardant has a melting point of more than or equal to 260° C. These two phosphorus-containing flame retardants have the characteristics of good heat discoloration resistance while providing flame retardant performance, so they are suitable for the present application.

Preferably, the high-melting-point phosphorus-containing flame retardant has a structure represented by Formula (1) or Formula (2) as follows:

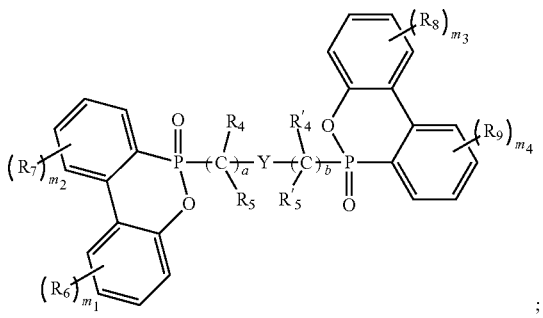

Formula (1)

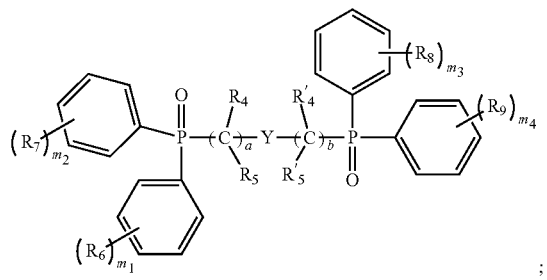

Formula (2)

wherein, Y is a directly-linking bond, aryl, alkyl, substituted or unsubstituted cycloalkyl or substituted or unsubstituted cycloalkenyl, and when the group contains a substituent, the substituent is C1-C6 (such as C1, C2, C3, C4, C5, C6) alkyl;

$R_6$, $R_7$, $R_8$ and $R_9$ are each independently hydrogen, C1-C6 (such as C1, C2, C3, C4, C5, C6) alkyl, C6-C12 (such as C6, C7, C8, C10, C12) aryl or C7-C15 (such as C7, C8, C9, C10, C12, C13, C15) aralkyl; or $R_6$, $R_7$, $R_8$ and $R_9$ are bonded to form a saturated or unsaturated ring, and the saturated or unsaturated ring is optionally substituted with C1-C6 alkyl;

$m_1$, $m_2$, $m_3$ and ma are each independently 1, 2, 3 or 4;

$R_4$, $R'_4$, $R_5$ and $R'_5$ are each independently hydrogen or C1-C6 alkyl; and a and b are each independently 0, 1, 2, 3, 4 or 5, and when Y is aryl or a directly-linking bond, a and b are not 0.

As a practical case, the high-melting-point phosphorus-containing flame retardant has a structure represented by the Formula as follows:

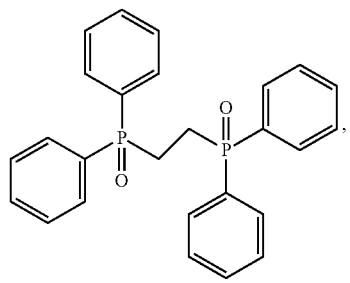

Formula (3)

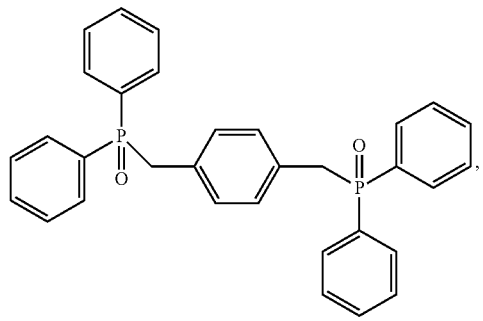

Formula (4)

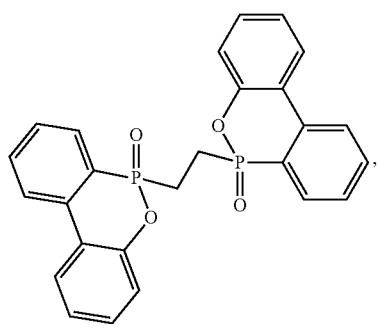

Formula (5)

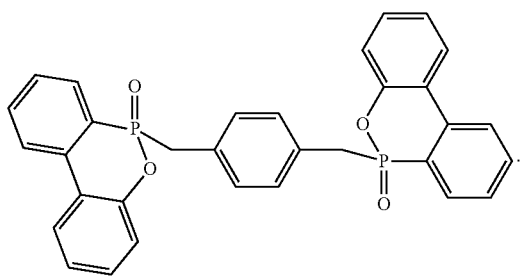

Formula (6)

In the present application, the phosphorus-containing flame retardants of the above-mentioned types are preferably used. And due to the rapidly deteriorated whiteness at high temperature and poor heat discoloration resistance, 10-(2,5-dihydroxyphenyl)-10-hydro-9-oxa-10-phosphaphenanthrene-10-oxide, 10-(2,5-dihydroxynaphthyl)-10-hydro-9-oxa-10-phosphaphenanthrene-10-oxide, 9,10-dihydro-9-oxa-10-phosphaphenanthrene-10-oxide, phosphorus-containing phenolic or the like are not suitable for the present application.

As a preferred technical solution of the present application, the thermosetting epoxy resin composition further includes a catalyst.

Preferably, based on that the total part by weight of the Component A, Component B, Component C, Component D and Component E is 100 parts, a part by weight of the catalyst is 0.001-5 parts, such as 0.001 part, 0.002 part, 0.005 part, 0.008 part, 0.01 part, 0.03 part, 0.05 part, 0.08 part, 0.1 part, 0.3 part, 0.5 part, 0.8 part, 1 part, 2 parts, 3 parts, 4 parts or 5 parts, etc; more preferably 0.02-4 parts, and further preferably 0.05-3 parts.

The usage amount of catalyst depends on the epoxy resin type, the curing agent type and the catalyst type. In the present application, the usage amount of catalyst is 0.001-5.0 wt % of the total amount of the thermosetting epoxy resin composition. If the catalyst has a too large usage amount (over 5.0 wt %), the reactivity of the thermosetting epoxy resin composition will be too high, easily generating by-products, and adversely affecting the uniformity of the conversion rate of curing reaction; if the catalyst has a too low usage amount, the reactivity of the resin composition will be too low; which is adverse to the production of prepreg. An empirical principle for using the catalyst in the present application is that the gelation time of the glue prepared by the resin composition should not be less than 120 s.

Preferably, the catalyst is selected from one or a combination of at least two of a tertiary amine, a tertiary phosphine, a quaternary ammonium salt, a quaternary phosphonium salt, an organometallic complex and an imidazole compound.

In the catalyst, examples of the tertiary amine are: triethylamine, tributylamine, dimethylamine ethanol, N,N-dimethyl-aminomethylphenol, benzyldimethylamine, etc.;

examples of the tertiary phosphine are: triphenylphosphine, etc.;

examples of the quaternary ammonium salt are: tetramethylammonium bromide, tetramethylammonium chloride, tetramethylammonium iodide, benzyltrimethylammonium chloride, benzyltriethylammonium chloride, hexadecyl trimethylammonium bromide, etc.;

specific examples of the quaternary phosphonium salt are: tetrabutylphosphonium chloride, tetrabutylphosphonium bromide, tetrabutylphosphonium iodide, tetraphenylphosphonium chloride, tetraphenylphosphonium bromide, tetraphenylphosphonium iodide, ethyltriphenylphosphonium chloride, propyltriphenylphosphonium chloride, propyltriphenylphosphonium bromide, propyltriphenylphosphonium iodide, butyltriphenylphosphonium chloride, butyltriphenylphosphonium bromide, butyltriphenylphosphonium iodide, etc.;

examples of the organometallic complex are: zinc acetate, copper acetate, nickel acetate, zinc octoate, copper octoate, iron octoate, cobalt octoate, copper acetylacetonate, zinc acetylacetonate, nickel acetylacetonate, iron acetylacetonate, zinc naphthenate, Cobalt acetylacetonate, copper naphthenate, iron naphthenate, cobalt naphthenate, etc.; and examples of the imidazole compound are: 2-methylimidazole, 2-ethyl-4-methylimidazole, 2-phenylimidazole, 2-undecylimidazole, 1-benzyl-2-methylimidazole, 2-heptadecylimidazole, 2-isopropylimidazole, 2-phenyl-4-methylimidazole, 2-dodecylimidazole, 1-cyanoethyl-2-methyl imidazole, etc.

The catalyst may be used alone or in combination of two or more.

In a second aspect, the present application provides a resin film, and the resin film is prepared by semi-curing the thermosetting epoxy resin composition according to the first aspect through baking and heating. In a third aspect, the present application provides a resin-coated copper foil, and the resin-coated copper foil is prepared by coating the thermosetting epoxy resin composition according to the first aspect on a copper foil, and heating the same for a semi-cured state.

In a fourth aspect, the present application provides a prepreg, and the prepreg includes a reinforcing material, and the thermosetting epoxy resin composition according to the first aspect which is adhered to the reinforcing material after impregnating and drying.

The present application has no special limitation on the preparation method of the prepreg. Exemplarily, the thermosetting epoxy resin composition according to the first aspect can be dissolved or dispersed in a solvent to obtain a resin adhesive solution; then the reinforcing material is impregnated with the resin adhesive solution, heated and dried, and thus the thermosetting epoxy resin composition is in the semi-cured state, so as to obtain the prepreg.

In the method, examples of the solvent that can be used are: ketones such as acetone, methyl ethyl ketone and methyl isobutyl ketone; hydrocarbons such as toluene and xylene; alcohols such as methanol, ethanol and primary alcohol; ethers such as ethylene glycol monomethyl ether and propylene glycol monomethyl ether; esters such as propylene glycol methyl ether acetate and ethyl acetate; aprotic solvents such as N,N-dimethylformamide and N,N-diethylformamide. The above-mentioned solvent may be used alone or in combination of two or more.

The reinforcing material can be an inorganic or organic reinforcing material. Examples of the inorganic reinforcing material are: woven or non-woven fabrics or paper made of glass fiber, carbon fiber, boron fiber, metal, etc. Among them, the glass fiber cloth or non-woven fabric can be E-glass, Q-type cloth, NE cloth, D-type cloth, S-type cloth, high silica cloth and the like. Examples of the organic reinforcing material are: woven or non-woven fabrics or paper made of polyester, polyamine, polyacrylic acid, polyimide, aramid, polytetrafluoroethylene, syndiotactic polystyrene, etc.

A temperature of heating and drying can be 80-250° C., such as 80° C., 90° C., 100° C., 110° C., 120° C., 130° C., 140° C., 150° C., 160° C., 170° C., 180° C., 190° C., 200° C., 210° C., 220° C., 230° C., 240° C. or 250° C., etc: a time can be 1-30 min, such as 1 min, 2 min, 3 min, 5 min, 8 min, 10 min, 12 min, 15 min, 18 min, 20 min, 22 min, 25 min, 28 min or 30 min, etc.

A content of the thermosetting epoxy resin composition in the prepreg can be 30-80 wt %; such as 30 wt %, 35 wt %, 40 wt %, 45 wt %, 50 wt %, 55 wt %, 60 wt %, 65 wt %, 70 wt %, 75 wt % or 80 wt %, etc.

In a fifth aspect, the present application provides a laminate, and the laminate includes one or at least two stacked prepregs according to the fourth aspect.

In a sixth aspect, the present application provides a metal foil-clad laminate, and the metal foil-clad laminate includes one or at least two stacked prepregs according to the fourth aspect, and a metal foil covering on one or two sides of the one prepreg or the stacked prepregs.

The present application has no special limitation on the preparation method of the metal foil-clad laminate. Exemplarily, the following methods can be used:

one or more prepregs are cut into a certain size, stacked and then sended to a lamination equipment for lamination: at the same time, the metal foil is placed on one or two sides of the prepregs, and the prepregs are subjected to pressing through hot-press forming for preparation of the metal foil-clad laminate.

In the method, the metal foil can be copper, brass, aluminum, nickel, and alloys or composite metal foils of these metals.

The pressing conditions of the laminate should be selected according to the actual situation of the epoxy resin composition. If the pressing pressure is too low, there will be voids in the laminate, and its electrical properties will decrease; if the lamination pressure is too high, there will be too much internal stress in the laminate, which will reduce the dimensional stability of the laminate. The suitable pressure, which is required in the molding, is needed to press the board for meeting the requirements. The usual guideline for conventional pressed laminates is: a lamination temperature of 130-250° C., a pressure of 3-50 kgf/cm² and a hot pressing time of 60-240 minutes. The above-mentioned prepreg and metal foil-clad laminate can be used to prepare printed circuit boards or complex multi-layer circuit boards by additive or layer reduction methods.

In a seventh aspect, the present application provides a printed circuit board, and the printed circuit board is prepared by removing part of the metal foil on the surface of the metal foil-clad laminate according to the sixth aspect to form a circuit.

It should be noted that the thermosetting epoxy resin composition provided in the present application can be used for preparing adhesives, coatings and composite materials, in addition to resin sheets, resin composite metal copper foils, prepregs, laminates, copper foil-clad laminates and printed circuit boards, and can also be used in the construction, aviation, shipbuilding, and automotive industries.

Compared with the prior art, the present application has the following beneficial effects:

in the present application, the phosphorus-containing anhydride with the structure of Formula I or Formula II is used to combine a specific epoxy resin in a specific ratio, resulting in that the obtained thermosetting epoxy resin composition has high heat yellowing resistance, dimensional stability and moisture resistance while reaching V0 grade flame retardancy, which is especially suitable for LED and other fields.

DETAILED DESCRIPTION

Technical solutions of the present application are further described below in conjunction with specific embodiments. Those skilled in the art should understand that the embodiments described herein are merely used for a better understanding of the present application and should not be construed as specific limitations to the present application.

Synthesis Example 1: Synthesis of
Phosphorus-Containing Anhydride 1

Nadic anhydride

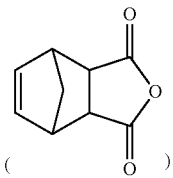 [SMILES: O=C1OC(=O)C2C3C=CC(C3)C12]

and a phosphorus compound

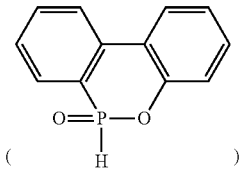 [SMILES: O=[PH]1Oc2ccccc2-c2ccccc21]

reacted in the presence of benzoyl peroxide as an initiator at a reaction temperature of 135° C., and the carbon-carbon double bond in nadic anhydride reacted with the active hydrogen group in the phosphorus compound, so as to obtain the phosphorus-containing anhydride 1.

Phosphorus-containing anhydride 1:

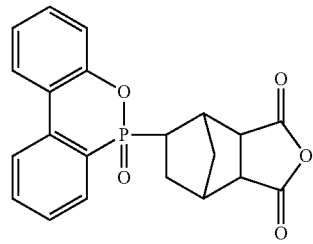 [SMILES: O=C1OC(=O)C2C3CC(CC3P3(=O)Oc4ccccc4-c4ccccc43)C12]

Synthesis Example 2: Synthesis of Phosphorus-Containing Anhydride 2

Endomethyl nadic anhydride

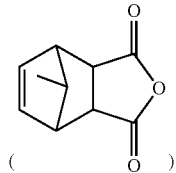

and a phosphorus compound

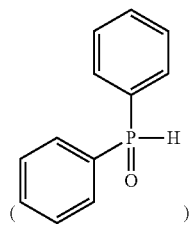 [SMILES: O=[PH](c1ccccc1)c1ccccc1]

reacted in the presence of benzoyl peroxide as an initiator at a reaction temperature of 135° C., and the carbon-carbon double bond in nadic anhydride reacted with the active hydrogen group in the phosphorus compound, so as to obtain the phosphorus-containing anhydride 2.

Phosphorus-containing anhydride 2:

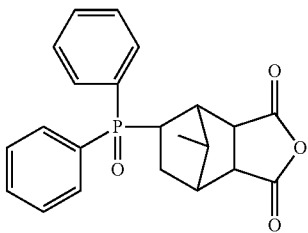 [SMILES: CC1C2CC(P(=O)(c3ccccc3)c3ccccc3)C1C1C(=O)OC(=O)C21]

Synthesis Example 3: Synthesis of Phosphorus-Containing Anhydride 3

Nadic anhydride

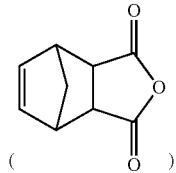 [SMILES: O=C1OC(=O)C2C3C=CC(C3)C12]

and a phosphorus compound

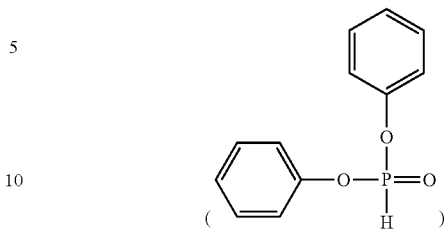

reacted in the presence of benzoyl peroxide as an initiator at a reaction temperature of 135° C., and the carbon-carbon double bond in nadic anhydride reacted with the active hydrogen group in the phosphorus compound, so as to obtain the phosphorus-containing anhydride 3.

Phosphorus-containing anhydride 3:

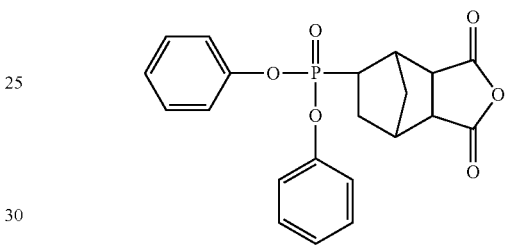

Synthesis Example 4: Synthesis of Phosphorus-Containing Anhydride 4

A siloxy-containing nadic anhydride

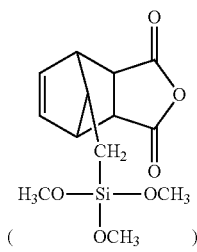 [SMILES: CO[Si](CC1C2C=CC1C1C(=O)OC(=O)C21)(OC)OC]

and a phosphorus compound

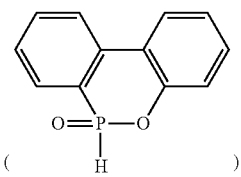 [SMILES: O=[PH]1Oc2ccccc2-c2ccccc21]

reacted in the presence of benzoyl peroxide as an initiator at a reaction temperature of 135° C., and the carbon-carbon double bond in nadic anhydride reacted with the active hydrogen group in the phosphorus compound, so as to obtain the phosphorus-containing anhydride 4.

Phosphorus-containing anhydride 4:

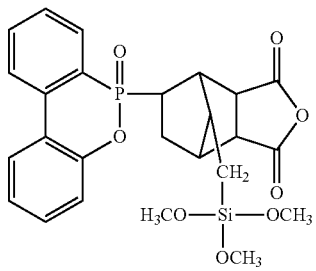 [SMILES: CO[Si](CC1C2CC(P3(=O)Oc4ccccc4-c4ccccc43)C1C1C(=O)OC(=O)C21)(OC)OC]

The sources of raw materials used in examples and comparative examples of the present application are shown in Table 1 as follows.

TABLE 1

| Component | Type | Brand | Supplier |
|---|---|---|---|
| A | Phosphorus-containing anhydride 1 | Prepared in Synthesis Example 1 | / |
|  | Phosphorus-containing anhydride 2 | Prepared in Synthesis Example 2 | / |
|  | Phosphorus-containing anhydride 3 | Prepared in Synthesis Example 3 | / |
|  | Phosphorus-containing anhydride 4 | Prepared in Synthesis Example 4 | / |
|  | Phosphorus-containing phenolic | XZ92741 | DOW |
| B | Styrene-maleic anhydride | EF40 | Cray Valley |
|  | Styrene-maleic anhydride | EF60 | Cray Valley |
|  | Methyltetrahydrophthalic anhydride | / | Aladdin |
| C | Bisphenol A epoxy resin | GELR128E | Hongchang |
|  | Bisphenol A epoxy resin | GESN901A80 | Hongchang |
|  | Bisphenol F epoxy resin | GEFR170 | Hongchang |
|  | Biphenyl epoxy resin | NC3000H | Nippon Kayaku |
|  | Dicyclopentadiene novolac epoxy resin | 7200H | DIC |
|  | Phosphorus-containing epoxy resin | BEP310A75 | Changchun resin |
|  | Phosphorus-containing epoxy resin | BEP330A70 | Changchun resin |
| D | Titanium dioxide | TA-300 | Fuji, Japan |
|  | Boehmite | BG601 | Anhui Estone |
|  | Aluminum hydroxide | C303 | Sumitomo, Japan |
|  | Silica |  |  |
| E | Aluminum phosphate salt | OP935 | Clariant |
|  | High-melting-point phosphorus-containing flame retardant | (Formula 5) | Reference CN20108002202.6 |
|  | High-melting-point phosphorus-containing flame retardant | (Formula 6) | Reference CN20108002202.6 |
|  | DOPO | HCA | Sanko |
| Catalyst | 2-ethyl 4-methylimidazole | 24MI |  |

Examples 1-7

Examples 1-7 each provide a copper foil-clad laminate, of which the preparation method is as follows.

(1) Preparation of Resin Adhesive Solution

Component A of a phosphorus-containing anhydride, Component B of a phosphorus-free anhydride, Component C of an epoxy resin, Component D of a filler, and Component E of a phosphorus-containing flame retardant, a catalyst, were added to a solvent in proportion, and mixed uniformly, so as to obtain the resin adhesive solution;

(2) Preparation of Prepreg

A glass fabric was impregnated with the resin adhesive solution, and then baked in an oven at 155° C. to remove the solvent, so as to obtain the prepreg;

(3) Preparation of Copper Foil-Clad Laminate

The obtained prepreg was stacked according to a certain number, added with an 18-micron copper foil on both sides, respectively, and cured in a press at 200° C. for 90 minutes, so as to obtain the copper foil-clad laminate.

The types and usage amounts (parts by weight) of the raw materials used in Examples 1-7 and the performance data of the obtained copper clad laminates are shown in Table 2 as follows.

TABLE 2

| | Raw material | Example 1 | Example 2 | Example 3 | Example 4 | Example 5 | Example 6 | Example 7 |
|---|---|---|---|---|---|---|---|---|
| A | Phosphorus-containing anhydride 1 | 5 | | | | | | |
| | Phosphorus-containing anhydride 2 | | 10 | 5 | | | | |
| | Phosphorus-containing anhydride 3 | | | | 3 | 3 | 3 | 3 |
| | Phosphorus-containing anhydride 4 | | | | | | | |
| B | EF40 | 10 | 5 | 20 | 20 | | | |
| | EF60 | | | | | 20 | 35 | 17 |
| C | NC3000H | | | 15 | | | | |
| | GELR128E | | | | 22 | | 17 | 5 |
| | GESN901A80 | 35 | 30 | | | 20 | | |
| D | Titanium dioxide | 50 | 50 | 50 | 50 | 50 | 40 | 65 |
| E | OP935 | 0 | 5 | 5 | 5 | 5 | 5 | 10 |
| Solvent | Butanone | 50 | 50 | 50 | 50 | 50 | 50 | 50 |
| Catalyst | 24MI | 0.03 | 0.03 | 0.03 | 0.03 | 0.03 | 0.03 | 0.03 |
| Performance of copper clad laminate | Dimensional stability (ppm) | 200 | 200 | 180 | 200 | 230 | 270 | 180 |
| | Heat discoloration resistance | ○ | ○ | ○ | ○ | ○ | ○ | ○ |
| | Flame retardancy | V0 | V0 | V0 | V0 | V0 | V0 | V0 |
| | Water absorption rate (%) | 0.23 | 0.31 | 0.17 | 0.23 | 0.3 | 0.27 | 0.23 |

Examples 8-18

Examples 8-18 each provide a copper foil-clad laminate, which differs from Example 1 only in the types and usage amounts of the raw materials used. The types and usage amounts (parts by weight) of the raw materials used in Example 8-18 and the performance data of the obtained copper clad laminate are shown in Table 3 and Table 4 as follows.

TABLE 3

| | Raw material | Example 8 | Example 9 | Example 10 | Example 11 | Example 12 | Example 13 | Example 14 |
|---|---|---|---|---|---|---|---|---|
| A | Phosphorus-containing anhydride 1 | | | | | | | |
| | Phosphorus-containing anhydride 2 | | 5 | 5 | 5 | 5 | 5 | 5 |
| | Phosphorus-containing anhydride 3 | | | | | | | |
| | Phosphorus-containing anhydride 4 | 2 | | | | | | |
| B | EF40 | | 20 | 20 | 20 | 20 | 20 | |
| | Methyltetrahydrophthalic anhydride | 5 | | | | | | 10 |
| C | NC3000H | | | | | | | |
| | GELR128E | 15 | 15 | 15 | | | 10 | 25 |
| | GESN901A80 | | | | 15 | | | |
| | GEFR170 | | | | | 15 | 5 | |
| D | Titanium dioxide | 70 | 55 | 55 | 55 | 55 | 55 | 50 |
| E | OP935 | 8 | | | | | | 10 |
| | High-melting-point phosphorus-containing flame retardant (Formula 5) | | | 5 | 5 | 5 | 5 | |
| | High-melting-point phosphorus-containing flame retardant (Formula 6) | | 5 | | | | | |

TABLE 3-continued

|  | Raw material | Example 8 | Example 9 | Example 10 | Example 11 | Example 12 | Example 13 | Example 14 |
|---|---|---|---|---|---|---|---|---|
| Solvent | Butanone | 50 | 50 | 50 | 50 | 50 | 50 | 50 |
| Catalyst | 24MI | 0.03 | 0.03 | 0.03 | 0.03 | 0.03 | 0.03 | 0.03 |
| Performance of copper clad laminate | Dimensional stability (ppm) | 290 | 230 | 230 | 220 | 220 | 220 | 280 |
|  | Heat discoloration resistance | ◯ | ◯ | ◯ | ◯ | ◯ | ◯ | ◯ |
|  | Flame retardancy | V0 | V0 | V0 | V0 | V0 | V0 | V0 |
|  | Water absorption rate (%) | 0.10 | 0.31 | 0.17 | 0.23 | 0.3 | 0.27 | 0.23 |

TABLE 4

|  | Raw material | Example 15 | Example 16 | Example 17 | Example 18 |
|---|---|---|---|---|---|
| A | Phosphorus-containing anhydride 1 | 5 | 5 | 5 | 5 |
|  | Phosphorus-containing anhydride 2 |  |  |  |  |
|  | Phosphorus-containing anhydride 3 |  |  |  |  |
|  | Phosphorus-containing anhydride 4 |  |  |  |  |
| B | EF40 | 10 | 10 | 10 | 10 |
|  | Methyltetrahydrophthalic anhydride |  |  |  |  |
| C | NC3000H |  |  |  |  |
|  | GELR128E |  |  |  |  |
|  | GESN901A80 | 35 | 35 | 35 | 35 |
|  | GEFR170 |  |  |  |  |
| D | Titanium dioxide |  | 30 | 50 | 50 |
|  | Boehmite | 50 |  |  | 10 |
|  | Aluminum hydroxide |  | 20 |  |  |
|  | Silica |  |  | 10 |  |
| E | OP935 |  |  |  |  |
|  | High-melting-point phosphorus-containing flame retardant (Formula 5) |  |  |  |  |
|  | High-melting-point phosphorus-containing flame retardant (Formula 6) |  |  |  |  |
| Solvent | Butanone | 50 | 50 | 50 | 50 |
| Catalyst | 24MI | 0.03 | 0.03 | 0.03 | 0.03 |
| Performance of copper clad laminate | Dimensional stability (ppm) | 275 | 280 | 280 | 280 |
|  | Heat discoloration resistance | ◯ | ◯ | ◯ | ◯ |
|  | Flame retardancy | V0 | V0 | V0 | V0 |
|  | Water absorption rate (%) | 0.23 | 0.23 | 0.23 | 0.20 |

Comparative Example 1

This comparative example provides a copper foil-clad laminate, which differs from Example 1 in that Component A of phosphorus-containing anhydride 1 was replaced with a non-reactive flame retardant of aluminum phosphate salt with an equivalent amount.

Comparative Example 2

This comparative example provides a copper foil-clad laminate, which differs from Example 2 in that a usage amount of Component A of phosphorus-containing anhydride 2 was 15 parts by weight.

Comparative Example 3

This comparative example provides a copper foil-clad laminate, which differs from Example 1 in that Component A of phosphorus-containing anhydride 1 was replaced with a flame-retardant curing agent of phosphorus-containing phenolic with an equivalent amount.

Comparative Example 4

This comparative example provides a copper foil-clad laminate, which differs from Example 1 in that Component A of phosphorus-containing anhydride 1 was replaced with a flame-retardant curing agent of phosphorus-containing phenolic, and a phosphorus content of the resin composition was kept the same as that in Example 1.

Comparative Examples 5-7

These comparative examples each provide a copper foil-clad laminate, which differs from Example 3 in the type of Component C.

The types and usage amounts (parts by weight) of the raw materials used in Comparative Examples 1-7 and the performance data of the obtained copper foil-clad laminates are shown in Table 5 as follows.

It can be seen from the test results in Table 5 that compared with Example 1, Comparative Example 1 used the same amount of aluminum phosphate flame retardant to replace the phosphorus-containing anhydride 1, obtained the

TABLE 5

| | Raw material | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| A | Phosphorus-containing anhydride 1 | | | | | | | |
| | Phosphorus-containing anhydride 2 | | 15 | | | 5 | 5 | 5 |
| | Phosphorus-containing anhydride 3 | | | | | | | |
| | Phosphorus-containing anhydride 4 | | | | | | | |
| | XZ92741 | | | 5 | 5.6 | | | |
| B | EF40 | 10 | 5 | 10 | 10 | 20 | 20 | 20 |
| | EF60 | | | | | | | |
| C | NC3000H | | | | | | 10 | |
| | GELR128E | | | | | | | 10 |
| | GESN901A80 | 35 | 30 | 35 | 35 | | | |
| | GEFR170 | | | | | | | |
| | 7200H | | | | | 15 | | |
| | BEP330A70 | | | | | | 5 | |
| | BEP310A75 | | | | | | | 5 |
| D | Titanium dioxide | 50 | 50 | 50 | 50 | 55 | 55 | 55 |
| E | OP935 | 5 | 5 | | | 5 | 5 | 5 |
| | HCA | | | | | | | |
| Solvent | Butanone | 50 | 50 | 50 | 50 | 50 | 50 | 50 |
| Catalyst | 24MI | 0.03 | 0.03 | 0.03 | 0.03 | 0.03 | 0.03 | 0.03 |
| Performance of copper clad laminate | Dimensional stability (ppm) | 290 | 400 | 280 | 280 | 280 | 270 | 270 |
| | Heat discoloration resistance | ○ | X | X | X | X | X | X |
| | Flame retardancy | fail | V0 | fail | V0 | V0 | V0 | V0 |
| | Water absorption rate (%) | 0.27 | 0.55 | 0.23 | 0.25 | 0.27 | 0.27 | 0.30 |

The test methods for the above performance are described below.
1. Dimensional stability: The dimensional change rate of a laminate of 300 mm×300 mm in size was measured by image observation, and the method refers to IPC-TM650-2.4.39.
2. Heat discoloration resistance:
A laminate of 50 mm×50 mm was prepared, processed at a high temperature of 200° C. for 4 hours, and then inspected whether discoloration occurred.
○ represented almost no discoloration;
Δ represented slight discoloration; and
X represented yellowing.
3. Flame retardancy: This performance was tested according to the flammability method specified in UL94.
4. Water absorption rate: A laminate of 100 mm×100 mm was prepared, processed in a pressure cooker at 103 kPa and 121° C. for 2 hours, and measured for the weight change rate, namely, the water absorption rate.

It can be seen from the Tables 2-4 that the copper foil-clad laminate prepared by using the thermosetting epoxy resin composition provided in the present application has excellent dimensional stability, flame retardancy and heat discoloration resistance, and low water absorption rate as well. Its flame retardant grade reached V0 grade, the dimensional change rate was 180-290 ppm in IPC-TM650-2.4.39 test, the color had no obvious change after high temperature treatment at 200° C., and the water absorption rate was 0.17-0.31%.

copper foil-clad laminate with deteriorated dimensional stability, and also failed to reach V0 grade flame retardancy.

Compared with Example 2, Comparative Example 2 added an excessive amount of Component A of phosphorus-containing anhydride, and thus the dimensional stability, heat discoloration resistance and water absorption performance of the obtained copper foil-clad laminate obviously deteriorated.

Compared with Example 1, Comparative Example 3 used the same amount of flame-retardant curing agent of phosphorus-containing phenolic to replace the phosphorus-containing anhydride 1, and the obtained copper foil-clad laminate which could not reach V0 grade flame retardancy and also had the significantly deteriorated heat discoloration resistance.

Compared with Example 1, Comparative Example 4 used the flame-retardant curing agent of phosphorus-containing phenolic to replace the phosphorus-containing anhydride 1, and kept the phosphorus content unchanged in the resin composition: although the obtained copper foil-clad laminate reached V0 grade flame retardancy, the heat discoloration resistance and dimensional stability significantly deteriorated.

Compared with Example 3, Comparative Example 5 did not use epoxy resins of the type defined in the present application, and Comparative Examples 6-7 added other types of epoxy resins, and thus the obtained copper foil-clad laminates had significantly deteriorated heat discoloration resistant.

The applicant has stated that although the specific embodiments of the present application is described above, the protection scope of the present application is not limited to the embodiments, and it should be apparent to those skilled in the art that variations or replacements, which are obvious for those skilled in the art without departing from the technical scope disclosed in the present application, all fall within the protection scope and the disclosure scope of the present application.

What is claimed is:

1. A thermosetting epoxy resin composition, comprising the following components in part by weight:
Component A: 2-10 parts of a phosphorus-containing anhydride, Component B: 5-40 parts of a phosphorus-free anhydride, Component C: 5-45 parts of an epoxy resin, Component D: 40-70 parts of a filler, and Component E: 0-15 parts of a phosphorus-containing flame retardant;
the total part by weight of the Component A, Component B, Component C, Component D and Component E is 100 parts;
the phosphorus-containing anhydride has a structure represented by Formula I or Formula II as follows:

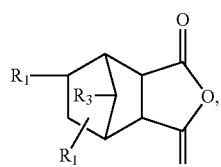

Formula I

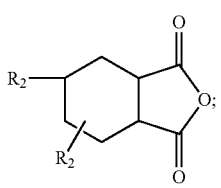

Formula II wherein $R^1$ and $R_2$ are each independently selected from any one of hydrogen, C1-C5 alkyl, substituted phenyl, unsubstituted phenyl, substituted naphthyl, and unsubstituted naphthyl;
$R_3$ is selected from any one of hydrogen, C1-C5 alkyl, siloxy and siloxyalkyl;
$X_1$ and $X_2$ are each independently selected from any one of

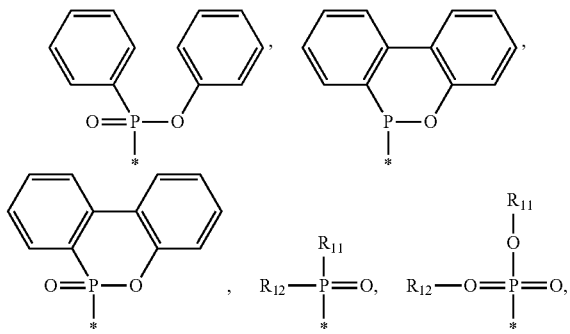

wherein * represents a linkage site of the group;
$R_{11}$ and $R_{12}$ are each independently selected from any one of C1-C5 alkyl, benzoxazinyl, substituted phenyl, unsubstituted phenyl, substituted naphthyl, and unsubstituted naphthyl;
when the above group contains a substituent, the substituent is a halogen atom or a C1-C5 linear or branched alkyl group;
wherein the epoxy resin is selected from a bisphenol A epoxy resin, a bisphenol F epoxy resin, a biphenyl epoxy resin, and combinations thereof;
wherein the epoxy resin of Component C is the only epoxy resin present in the composition; and
wherein the filler is titanium dioxide.

2. The thermosetting epoxy resin composition according to claim 1, wherein $R^3$ in Formula I is siloxy or siloxyalkyl.

3. The thermosetting epoxy resin composition according to claim 2, wherein $R^3$ in Formula I is selected from any one of

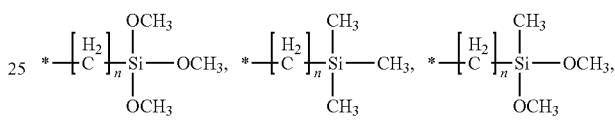

wherein n is an integer of 1-3, and * represents a linkage site of the group.

4. The thermosetting epoxy resin composition according to claim 2, wherein the phosphorus-free anhydride is selected from methyltetrahydrophthalic anhydride, methylnadic anhydride, styrene-maleic anhydride, and combinations thereof.

5. The thermosetting epoxy resin composition according to claim 4, wherein the styrene-maleic anhydride has a structure represented by Formula III as follows:

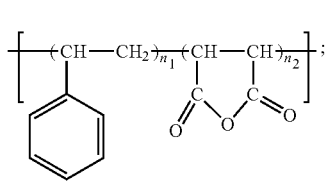

Formula III wherein $n_1:n_2=0.8-19:1$.

6. The thermosetting epoxy resin composition according to claim 4, wherein a number average molecular mass of the styrene-maleic anhydride is 1000-50000.

7. The thermosetting epoxy resin composition according to claim 2, wherein a median particle size of the filler is 0.1-10 mm.

8. The thermosetting epoxy resin composition according to claim 1,
wherein the phosphorus-containing flame retardant is an aluminum phosphate salt and/or a high-melting-point phosphorus-containing flame retardant, and the high-melting-point phosphorus-containing flame retardant has a melting point of more than or equal to 260° C.;
the high-melting-point phosphorus-containing flame retardant has a structure represented by Formula (1) or Formula (2) as follows:

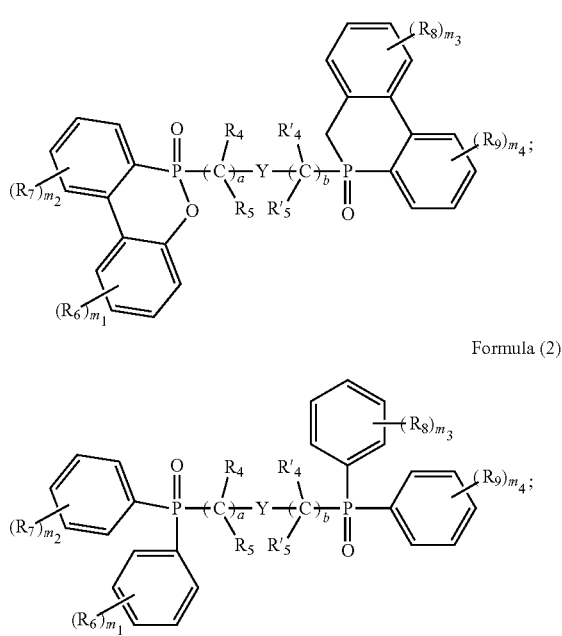

wherein Y is selected from any one of a directly-linking bond, aryl, alkyl, substituted cycloalkyl, unsubstituted cycloalkyl, substituted cycloalkenyl, and unsubstituted cycloalkenyl, and when the group contains a substituent, the substituent is C1-C6 alkyl;

$R_6$, $R_7$, $R_8$ and $R_9$ are each independently selected from any one of hydrogen, C1-C6 alkyl, C6-C12 aryl, and C7-C15 aralkyl; or $R_6$, $R_7$, $R_8$ and $R_9$ are bonded to form a saturated or unsaturated ring, and the saturated or unsaturated ring is optionally substituted with C1-C6 alkyl;

$m_1$, $m_2$, $m_3$ and $m_4$ are each independently 1, 2, 3 or 4;

$R_4$, $R'_4$, $R^5$ and $R'_5$ are each independently hydrogen or C1-C6 alkyl;

a and b are each independently 0, 1, 2, 3, 4 or 5, and when Y is aryl or a directly-linking bond, a and b are not 0.

9. The thermosetting epoxy resin composition according to claim 1, wherein the thermosetting epoxy resin composition further comprises 0.001-5 parts by weight of a catalyst, based on the total 100 parts by weight of the Component A, Component B, Component C, Component D and Component E.

10. The thermosetting epoxy resin composition according to claim 4, wherein the catalyst is selected from a tertiary amine, a tertiary phosphine, a quaternary ammonium salt, a quaternary phosphonium salt, an organometallic complex, an imidazole compound, and combinations thereof.

11. A resin film, which is prepared by semi-curing the thermosetting epoxy resin composition according to claim 1 through baking and heating.

12. A resin-coated copper foil, which is prepared by coating the thermosetting epoxy resin composition according to claim 1 on a copper foil, and heating the same for a semi-cured state.

13. A prepreg, comprising a reinforcing material, and the thermosetting epoxy resin composition according to claim 1 which is adhered to the reinforcing material after impregnating and drying.

14. A laminate, comprising one or at least two stacked prepregs according to claim 13.

15. A metal foil-clad laminate, comprising one or at least two stacked prepregs according to claim 13, and a metal foil covering on one or two sides of the one prepreg or the stacked prepregs.

16. A printed circuit board, which is prepared through a method of removing part of the metal foil on the surface of the metal foil-clad laminate according to claim 15 to form a circuit.

* * * * *